United States Patent [19]

Takahashi

[11] Patent Number: 5,048,861
[45] Date of Patent: Sep. 17, 1991

[54] ACTIVE SUSPENSION SYSTEM AND PRESSURE CONTROL VALVE THEREFOR

[75] Inventor: Kenro Takahashi, Kanagawa, Japan

[73] Assignee: Nissan Motor Company, Limited, Japan

[21] Appl. No.: 501,085

[22] Filed: Mar. 27, 1990

[30] Foreign Application Priority Data

Mar. 27, 1989 [JP] Japan .................................. 1-71989

[51] Int. Cl.⁵ .............................................. B60G 17/08
[52] U.S. Cl. .................................... 280/707; 280/840; 280/709; 188/299
[58] Field of Search ............... 280/707, 703, 714, 840, 280/6.1, 6.12, 840, 707, 709; 267/64.16; 188/299; 364/64.16

[56] References Cited

U.S. PATENT DOCUMENTS

| | | | |
|---|---|---|---|
| 4,702,490 | 10/1987 | Yamaguchi et al. | 280/707 |
| 4,801,115 | 1/1989 | Heard | 248/219.3 |
| 4,801,155 | 1/1989 | Fukushima et al. | 280/840 |
| 4,848,790 | 7/1989 | Fukunaga et al. | 280/707 |
| 4,865,348 | 9/1989 | Hano et al. | 280/707 |
| 4,903,983 | 2/1990 | Fukushima et al. | 280/707 |

FOREIGN PATENT DOCUMENTS

| | | |
|---|---|---|
| 0286072 | 4/1987 | European Pat. Off. . |
| 0249209 | 6/1987 | European Pat. Off. . |
| 0249227 | 6/1987 | European Pat. Off. . |
| 0285153 | 3/1988 | European Pat. Off. . |
| 0284053 | 9/1988 | European Pat. Off. . |
| 0314164 | 10/1988 | European Pat. Off. . |
| 0318721 | 11/1988 | European Pat. Off. . |
| 0318932 | 11/1988 | European Pat. Off. . |
| 0345816 | 6/1989 | European Pat. Off. . |
| 0345817 | 6/1989 | European Pat. Off. . |
| 3902312 | 1/1989 | Fed. Rep. of Germany . |
| 3904922 | 2/1989 | Fed. Rep. of Germany . |
| 3910030 | 3/1989 | Fed. Rep. of Germany . |
| 3910445 | 3/1989 | Fed. Rep. of Germany . |

Primary Examiner—Richard A. Bertsch
Attorney, Agent, or Firm—Lowe, Price, LeBlanc & Becker

[57] ABSTRACT

A pressure control valve unit to be employed in an active suspension system includes a valve member movable between a pressure increasing mode position, a pressure decreasing mode position and a pressure holding mode position for adjusting fluid pressure in a working chamber of an active cylinder disposed between a vehicular body and a suspension member rotatably supporting a road wheel. The valve member is further movable to a pressure relieving position in response to a pressure in the working chamber higher than a predetermined value. The valve member at the pressure relieving position establishes fluid communication between the working chamber and a drain line for draining pressurized fluid in the working chamber at a draining rate higher than that in said pressure decreasing mode position.

22 Claims, 4 Drawing Sheets

ACTIVE SUSPENSION SYSTEM AND PRESSURE CONTROL VALVE THEREFOR

BACKGROUND OF THE INVENTION

1. Field of the Invention

The present invention relates generally to an active suspension system for an automotive vehicle for absorbing and damping vibratory energy to achieve a high level of riding comfort and driving stability and, more particulary, to a pressure control valve unit to be employed in the active suspension system for adjusting suspension characteristics depending upon vehicular driving conditions and the type of vibrations encountered.

2. Description of the Background Art

U.S. Pat. No. 4,702,490, issued on Oct. 27, 1987, commonly assigned to the assignee of the present invention, discloses a typical construction of an active suspension system applicable for an automotive vehicle. The disclosed active suspension system includes a hydraulic cylinder disposed between a vehicular body and a suspension member rotatably supporting a vehicular road wheel. The hydraulic cylinder includes a thrusting piston which divides the interior space of the cylinder into a working chamber and a reference chamber. The working chamber is connected to a hydraulic circuit including a fluid pressure source unit and a pressure control valve. The pressure control valve incorporates an electrically operable actuator which controls valve position for adjusting the operational mode of the active suspension system for absorbing vibratory energy which causes relatively high frequency and small magnitude vibrations to the vehicular body resulting in a 'rough ride' feeling. The active suspension system described above also has an operational mode for damping vibratory energy which causes relatively low freqeuncy, large magnitude vibrations to the vehicular body which result in vehicular body attitude changes. The above described operational modes are neseccary in order to accomplish both high level riding comfort and driving stability.

For this purpose, the pressure control valve of the active suspension system includes a pilot pressure operated valve member which is movable between a pressure increasing position to increase fluid pressure in the working chamber, a pressure decreasing position to decrease fluid pressure in the working chamber and a pressure holding position to maintain a constant fluid pressure in the working chamber. The valve member is active for establishing fluid pressure balance between the working chamber and the reference chamber while in the pressure holding position so that the unsprung mass induced mode of the vibratory energy is converted into fluid pressure and the converted fluid energy is effectively absorbed.

The active suspension system includes an electronic or electric control unit designed to receive one or more suspension control parameters from one or more sensors. The control unit detects sprung mass induced vibratory energy, having relatively low frequency and large magnitude, and produces a suspension control signal to be supplied to the pressure control valve for operating the valve member between the pressure increasing position and the pressure decreasing position in order to suppress vehicular body attitude change which is caused by sprung mass induced vibratory energy.

Another construction of a pressure control valve unit has been disclosed in U.S. Pat. No. 4,801,155, issued on January 31, 1989, to Fukushima et al, which has been commonly assigned to the assignee of the present invention. The shown pressure control valve unit has a valve construction different from the foregoing prior art. However, the disclosed pressure control valve performs substantially equivalent pressure adjusting operations as that done by the foregoing prior art.

Such prior proposed active suspension systems are generally effective and successful in achieving substantially or satisfactorily high level vehicular riding comfort and driving stability. However, on the other hand, when a vehicle travels over a substantially rough road causing bottoming, the above described systems tend to cause too rapid variation in the fluid pressure in the working chamber and/or in the pressure control valve to effectively absorb this type of vibratory energy. When this happens, an extraordinarily high pressure is induced within the hydraulic circuit. In view of such possibility, the components of the active suspension system have to be designed so as not to break or become damaged even at such extraordinarily high pressures. Building a hydralic circuit and valve which can sustain such pressures clearly adds to the cost of producing a vehicular suspension system.

SUMMARY OF THE INVENTION

Therefore, it is an object of the present invention to provide a pressure control valve unit for use in an active suspension system, which can effectivly reduce fluid pressure induced upon occurrence of bottoming.

Another object of the invention is to provide an active suspension system which incorporates a pressure control valve which is capable of relieving the extraordinarily high fluid pressures in order to protect system components.

In order to accomplish aforementioned and other objects, a pressure control valve unit to be employed in an active suspension system, according to the present invention, includes a valve member movable between a pressure increasing mode position, a pressure decreasing mode position and a pressure holding mode position for adjusting fluid pressure in a working chamber of an active cylinder disposed between a vehicular body and a suspension member rotatably supporting a road wheel. The valve member is further movable to a pressure relieving position in response to a pressure in the working chamber higher than a predetermined value. The valve member at the pressure relieving position establishes fluid communication between the working chamber and a drain line for draining the fluid pressure in the working chamber at a draining rate higher than that in said pressure decreasing mode position.

According to one aspect of the invention, a pressure control valve for adjusting pressure in a working chamber of a fluid pressure operated unit by introducing and draining working fluid into and from the working chamber, comprises:

a first chamber connected to the working chamber for fluid communication therebetween via a first line;

a second chamber connected to a fluid pressure source via a second line for introducing line pressure from the fluid pressure source into the working chamber;

a third chamber connected to a fluid pressure source via a third line for draining fluid to the fluid pressure source from the working chamber;

a valve member for selectively establishing and blocking fluid communication between the first and second chambers and the first and third chambers, the valve member being movable in a first range between, a first position, for establishing fluid communication between the first and second chambers through a first predetermined path opening area and, a second position for establishing a fluid communication between the first and third chambers through a second predetermined path opening area, across a third position, where fluid communication between the first and second chambers and the first and third chambers are both blocked; and means, responsive to a fluid pressure in the working chamber greater than a predetermined pressure, permitting movement of the valve member within a second range greater than the first range. The second range including a fourth position in which fluid communication between the first and second chambers is established through a third path opening area greater than the first path opening area and, a fifth position, in which fluid communication between the first and third chambers is established through a fourth path opening area greater than the second path opening area.

The valve member is designed for varying the rate of increase of fluid path opening area so that the increase rate in a region from the first position to the fourth position is greater than that from the third position to the first position. Also, the valve member may be designed for varying the rate of increase of the fluid path opening area so that the increase rate in a region from the second position to the fifth position is greater than that from the third position to the second position. Preferably, the fourth and fifth positions of the valve member are set at the stroke ends of the valve member.

The pressure control valve unit may further comprise an electrically operable actuator associated with the valve member for causing movement of the valve member within the first range at a controlled magnitude for selectively establishing fluid ccmmunication between the first and second chambers and the first and third chambers with a limited fluid path opening area varying in a range between zero and a predetermined maximum to the first path opening area and between zero and a predetermined maximum to the second second path opening area.

The valve member may be formed with at least one notch axially extending for a predetermined length defining an overlap range for the first chamber in a range between the first position and the second position and between the first position and the third position of the valve member so that a limited flow rate of fluid communication between the first and second chambers and the between first and third chambers is established via the notch within the first range of valve member movement. The valve member may establish direct fluid communication between the first and second chambers during movement from the first position to the fourth position, the overlap magnitude of the first and second chambers being increased according to movement of the valve member toward the fourth position, the valve member also establishing direct fluid communication between the first and third chambers during movement from the second position to the fifth position, the overlap magnitude of the first and third chambers being increased according to movement of the valve member toward the fifth position.

According to another aspect of the invention, a pressure control valve for adjusting pressure in a working chamber of a hydraulic damper in an active suspension system of an automotive vehicle, by introducing and draining working fluid into and from the working chamber, comprises:

a first chamber connected to the working chamber for fluid communication therebetween via a first line;

a second chamber connected to a fluid pressure source via a second line for introducing line pressure from the fluid pressure source into the working chamber;

a third chamber connected to a fluid pressure source via a third line for draining fluid to the fluid pressure source from the working chamber;

a valve member for selectively establishing and blocking fluid communication between the first and second chambers and the first and third chambers, the valve member being movable in a first range between a first position for establishing fluid communication with the first and second chambers and a second position for establishing fluid communication with the first and third chambers, through a first predetermined path opening area, and across a third position where fluid communication of the first and second chambers and the first and third chambers are both blocked; and means, responsive to a fluid pressure in the working chamber greater than a predetermined pressure, for permitting movement of the valve member within a second range greater than the first range between a fourth position and a fifth position at which fluid communication between the first and second chambers and between the first and third chambers is established through a predetermined second path opening area greater than the first path opening area.

According to a further aspect of the invention, an active suspension system for an automotive vehicle comprises:

a suspension mechanism including a hydraulic cylinder disposed between a vehicular body and a suspension member rotatably supporting a road wheel, the hydraulic cylinder defining a working chamber therein, which working chamber is variable of volume according to a piston stroke induced by relative movement between the vehicular body and the suspension member;

a fluid source for feeding pressurized working fluid;

a pressure control valve disposed in a hydraulic circuit connecting the fluid source and the working chamber for adjusting fluid pressure in the working chamber by controlling the introduction and draining of working fluid into and from the working chamber, the pressure control valve comprising:

a first chamber connected to the working chamber for fluid communication therebetween via a first line;

a second chamber connected to a fluid pressure source via a second line for introducing line pressure from the fluid pressure source into the working chamber;

a third chamber connected to a fluid pressure source via a third line for draining fluid to the fluid pressure source from the working chamber;

a valve member for selectively establishing and blocking fluid communication between the first and second chambers and the first and third chambers, the valve member being movable in a first range between a first position for establishing fluid communication between the first and second chambers through a first predetermined path opening area and a second position for establishing a fluid communication between the first and third chambers through a second predetermined path opening area, and across a third position where fluid communication between the first and second chambers and the first and third chambers are both blocked; and means, responsive to a fluid pressure in the working chamber greater than a predetermined pressure for permitting movement of the valve member in a second range, greater than the first range, between a fourth position in which fluid communication is established between the first and second chambers through a third path opening area greater than the first path opening area and a fifth position in which fluid communication is established between the first and third chambers through a fourth path opening area greater than the second path opening area.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiments but are for explanation and understanding only.

In the drawings.

DESCRIPTION OF THE PREFERRED EMBODIMENT

Incorporation of Disclosure by Reference

Prior issued patents, all of which are commonly owned or assigned to the owner or assignee of the present invention, and for which a pressure control valve unit according to the present invention is applicable, are listed hereinbelow and are hereby expressly incorporated by such reference for relevant structure taught therein.

U.S. Pat. No. 4,909,534, issued Mar. 20, 1990.
U.S. Pat. No. 4,801,155, issued Jan. 31, 1989.
U.S. Pat. No. 4,888,696, issued Dec. 19, 1989.
U.S. Pat. No. 4,938,499, issued July 3, 1990.
U.S. Pat. No. 4,943,084, issued July 24, 1990.
U.S. Pat. No. 4,967,360, issued Oct. 30, 1990.
U.S. Pat. No. 4,905,152, issued Feb. 27, 1990.
U.S. Pat. No. 4,919,440, issued Apr. 24, 1990.
U.S. Pat. No. 4,911,469, issued Mar. 27, 1990.
U.S. Pat. No. 4,948,165, issued Aug. 14, 1990.
U.S. Pat. No. 4,911,468, issued Mar. 27, 1990.
U.S. Pat. No. 4,911,470, issued Mar. 27, 1990.
U.S. Pat. No. 4,961,565, issued Oct. 9, 1990.

Figure 1:
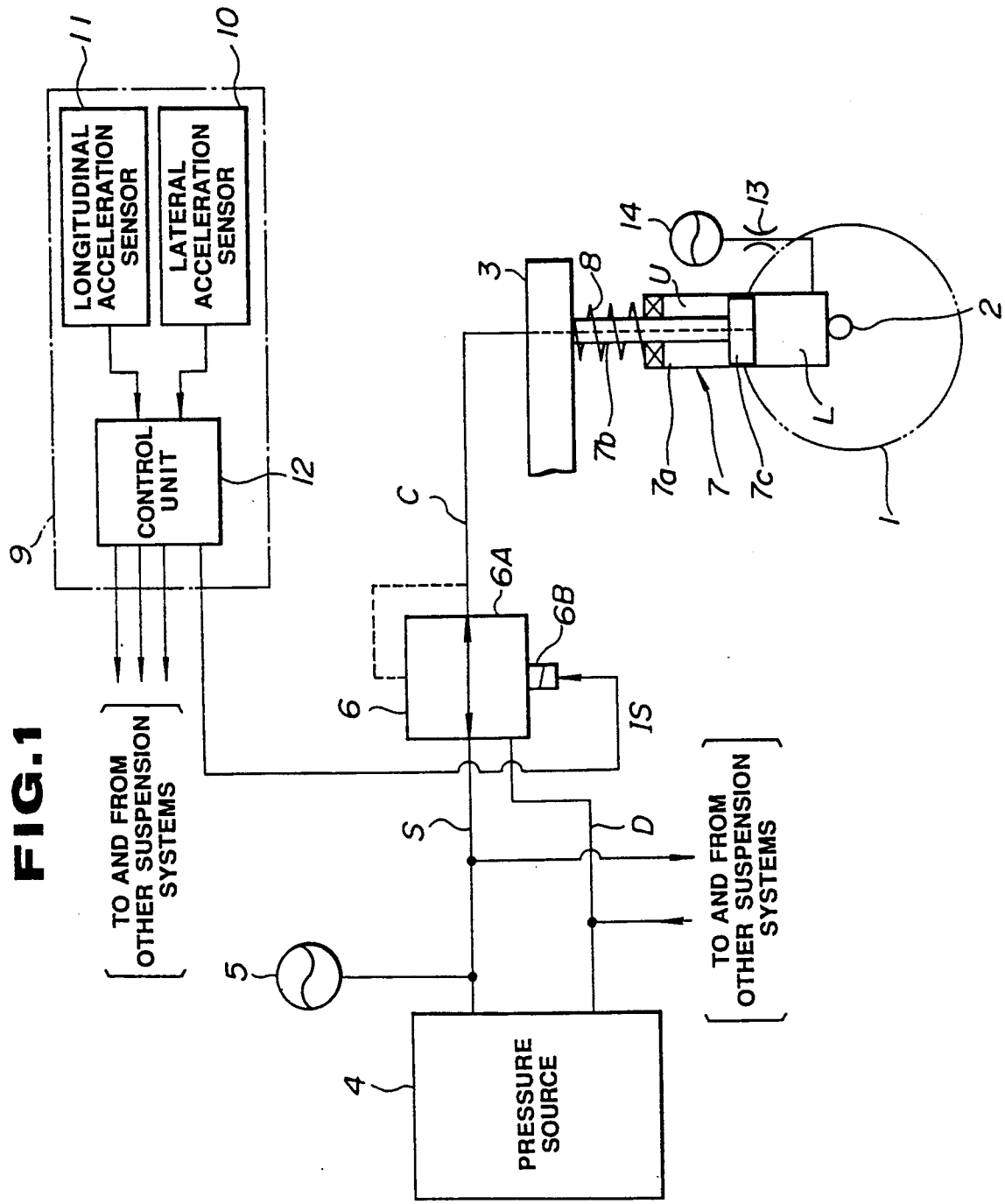
FIG. 1 is a diagram of a hydraulic circuit of an active suspension system, to which the preferred embodiment of a pressure control valve unit according to the present invention, is applicable.

Referring now to the drawings, particularly to FIG. 1, there is illustrated a hydraulic circuit, in a simplified schematic diagrammatic form, of an active suspension system for an automotive vehicle. The shown circuit principally illustrates a sole control channel for controlling suspension characteristics of a suspension system for one road wheel. It should be naturally appreciated that a substantially identical construction of control channels would be provided for the suspension systems of respective, or a selected group of more than two, road wheels of the vehicle.

As shown in FIG. 1, the preferred embodiment of an active suspension system includes an active hydraulic cylinder 7. The active cylinder 7 comprises a hollow cylinder tube 7a, a piston 7c disposed within the interior space of the cylinder tube, a piston rod 7b connected to the piston at one end and to a vehicular body 3 at the other end. The piston 7c separates the interior space of the cylinder tube into an upper reference chamber U and a lower working chamber L. The cylinder tube 7a is connected to a suspension member 2 which rotatably supports a road wheel 1.

A suspension coil spring 8 may be provided between the active cylinder 7 and the vehicle body 3 for resiliently suspending the vehicular body on the suspension system. In the shown construction of the invention, the suspension coil spring 8 is not strictly necessary and can be omitted if desired, for the purpose of reduction of weight, for example. Furthermore, when provided, the suspension coil spring 8 may be provided only in a capacity for supporting the static load of the vehicular body and not necessarily in a capacity for supporting the dynamic load of the vehicular body.

The working chamber L is connected to a fluid source unit 4 via a hydraulic circuit including a supply line S, a drain line D and a control line C. A pressure control valve unit 6 is provided in the hydraulic circuit. The control line C connects a control port of the pressure control valve unit 6 to the working chamber L. The supply line S is connected to an inlet port of the pressure control valve unit 6 for supplying line pressure thereinto. On the other hand, the drain line D connects a drain port of the pressure control valve unit for draining pressurized fluid therethrough. A pressure accumulator 5 for regulating line pressure in the supply line S is connected to the supply line. Another accumulator 14 is connected to the working chamber L via a flow restriction orifice 13. The accumulator 14 is cooperative with the flow restriction orifice for absorbing substantially high frequency, small magnitude vibratory energy input resulting from road shock, so that such road shock will not be transmitted to the vehicular body, thus avoiding a 'rough ride'. On the other hand, when the vibratory energy has relatively lower frequency and greater magnitude than that can be absorbed by the accumulator 14, absorption or damping of such vibratory energy is performed by the pressure control valve unit 6.

A control unit 12 which comprises a microprocessor, forms a suspension control system 9 together with sensors, such as a lateral acceleration sensor 10, a longitudinal acceleration sensor 11 and so forth. The control unit 12 receives sensor signals from various sensors for performing vehicular body attitude change suppressive suspension control, such as anti-pitching, anti-rolling, bounce suppression control and so forth. The control unit 6 thus outputs a suspension control signal for controlling the position of the pressure control valve 6. In order to change the valve position in response to the suspension control signal, the pressure control valve 6 incorporates an electromagnetic actuator 6B, such as a solenoid. In the shown embodiment, the electromagnetic actuator 6B comprises a proportioning solenoid responsive to a current level of the suspension control signal in the form of a current signal for shifting a valve spool for operating the pressure control valve at a variety of positions.

Figure 2:
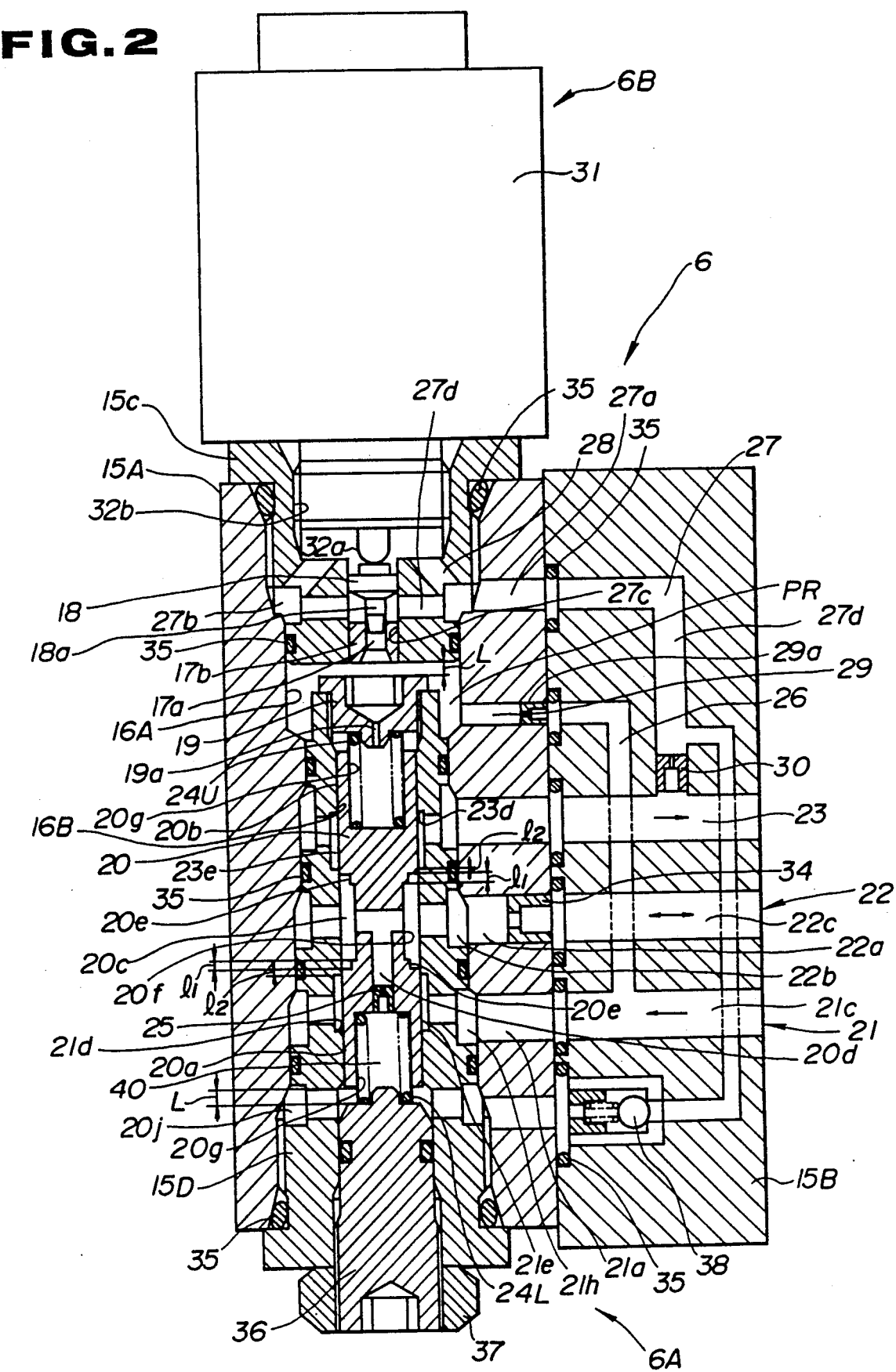
FIG. 2 is a section of the pressure control valve unit of the preferred embodiment according to the present invention.

FIG. 2 shows the detailed construction of the preferred embodiment of the pressure control valve 6 according to the present invention. As shown in FIG. 2, the shown embodiment of the pressure control valve unit 6 generally comprises a valve mechanism 6A and the proportioning solenoid 6B. A valve housing 15 mainly comprises a valve housing block 15A and a fluid path block 15B. The fluid path block 15B is rigidly fixed onto the valve housing block 15A with a plurality of sealing O rings 35.

The valve housing block 15A defines an axially extending valve bore which is generally represented by the reference numeral 16A. A generally cylindrical stationary sleeve 15D is disposed within the valve bore 16. The valve housing block 15A and the stationary sleeve 15D are cooperative with each other for defining a valve side inlet port section 21a communicated with a circumferentially extending annular chamber 21b. The valve side inlet port section 21a is aligned with a blocked path side inlet port section 21c for forming an inlet port 21. The inlet port 21 is communicated with the supply line S of the hydraulic circuit for introducing line pressure supplied from the fluid pressure source 4. A valve side control port section 22a with an annular chamber 22b is also defined by the valve housing block 15A and the stationary sleeve 15D. The valve side control port section 22a is defined in alignment with the fluid path side control port section 22c for forming a control port 22. The control port 22 is connected to the control line C for feeding control pressure to the working chamber L of the active cylinder 7. In a similar manner, a drain port 23 including a valve side drain port section 23a with an annular chamber 23b and a fluid path side drain port section 23c is provided. The drain port 23 is communicated with the drain line D for draining the pressurized fluid to return to the fluid pressure source 4. A flow restrictive orifice 34 is provided in the drain port 23 for restricting fluid flow therethrough. The valve housing block 15A further defines a pilot pressure inlet port 29 and a pilot pressure return port 27a.

A main valve spool 20 is thrustingly disposed within an axial bore 16B to which the aforementioned valve side inlet port section 21a, the control port section 22a and the drain port section 23a open. As can be seen, the main valve spool 20 has an inlet side land 20a and a drain side land 20b. The inlet side land 20a is cooperative with an annular groove 21d defined on the inner periphery of the stationary sleeve 15D for defining an annular inlet chamber 21e. Similarly, the drain side land 20b is cooperative with an annular groove 23d of the stationary sleeve 15D for defining an annular drain chamber 23e. Between the inlet and drain side lands 20a and 20b, an annular groove 20f is defined. The annular groove 20f is cooperative with the inner periphery of the axial bore 16B of the stationary sleeve 15D for forming an annular control chamber 20c. At the illustrated position of the main valve spool 20, the control chamber 20c is blocked from fluid communication with the inlet and drain chambers 21e and 23e. This position of the main valve spool 20 will be hereafter referred to as a "neutral position".

A closure plug 36 with a rock nut 37 is threadingly and sealingly engaged to the outer end (lower portion of FIG. 2) of the stationary sleeve 15D. At the inner end (upper portion of FIG. 2) of the stationary sleeve 15D, a fixed orifice block 19 which defines a fixed flow path area orifice 19a is defined. Bias springs 24U and 24L are disposed in the axial bore 16B. The bias springs 24U and 24L are seated at spring receptacle bores 20g and 20h at one end. The other ends of the bias springs 24U and 24L are respectively seated on the fixed orifice block 19 and the closure plug 36. The bias springs 24U and 24L exert spring force toward the neutral position of the main valve spool 20.

A plug 15C is threadingly fitted onto the inner end (upper portion of FIG. 2) of the bore 16A. The plug 15C is cooperative with the fixed orifice block 19 for defining a pilot chamber PR therebetween, to which the pilot pressure inlet port 29 opens to introduce the pilot pressure. The plug 15C further defines an annular pilot pressure return chamber 27b communicated with the pilot chamber PR via a center opening 27c and radial paths 27d of the plug 15C. The plug 15C further defines an actuator receptacle recess 32b to which the active end of the proportioning solenoid 6B is inserted. An annular valve seat member 17b defining a fluid path 17a opening to the pilot chamber PR is fitted to the inner end (lower portion of FIG. 2). Opposing the outer end (upper portion of FIG. 2) of the fluid path 17a, a poppet valve 18 with a valve stem 18a is diposed within the center opening 27c of the plug for thrusting movement therealong so that the valve stem 18a moves toward and away from the valve seat member 17b for establishing and blocking fluid communication therethrough.

The main valve spool 20 defines a feedback path 20d for fluid communication between the inlet chamber 21e and an annular feedback chamber 20j. A flow restrictive orifice 25 is disposed in the feedback path 20d for restricting fluid flow therethrough.

As can be seen from FIG. 2, the fluid path block 15B defines a pilot pressure supply path 26 for fluid communication between the inlet port 21 and the pilot port 29. The fluid path block 15B further defines a pilot pressure return path 27d communicating the pilot pressure return port 27 to the drain port 23. The pilot pressure return path 27d has a branch path 27f communicating the feedback chamber 20j with the pilot return path 27d. A flow restrictive orifice 30 is disposed in the pilot pressure return path 27d at an orientation downstream of the intersection between the pilot pressure return path and the branch path. On the other hand, a flow restrictive one-way check valve 38 is provided in the branch path 27f so as to prevent a surge of pressurized fluid from the feedback chamber to the pilot pressure return path 27d and permit a limited amount of fluid flow from the pilot pressure return path 27d to the feedback chamber.

With the shown construction, a drain establishing force equalling the total force of the bias spring 24L and the fluid pressure in the feedback chamber 20j is exerted on the main spool valve 20 so as to bias the main spool valve for establishing fluid communication between the control chamber 22b and the drain chamber 23d. For this, the drain side land 20b cooperates with the axial end edges of the drain chamber for forming a drain side variable orifice. Similarly, a pressure supply establishing force equalling the total force of the bias spring 24U and the fluid pressure in the pilot chamber PR as introduced via a flow restrictive orifice 19a is exerted on the main spool valve 20 so as to bias the main spool valve for establishing fluid communication between the control chamber 22b and the inlet chamber 21b. The inlet side land 20a cooperates with axial edge end of the inlet chamber 21e. the main valve spool is positioned at an orientation where the drain establishing force and the pressure supply establishing force balance. Therefore, at normal position, the drain establishing force and the pressure supply establishing force are balanced for establishing the neutral position of the main valve spool 20.

The proportioning solenoid 16B employed in the shown embodiment is known from the prior proposed applications, publications and patents and thus need not be disclosed in detail. Therefore, the proportioning solenoid 16B is simply illustrated as housed within a solenoid housing 31. As will be seen from FIG. 2, an actuation rod 32a is held in contact with the poppet valve 18.

Figure 3:
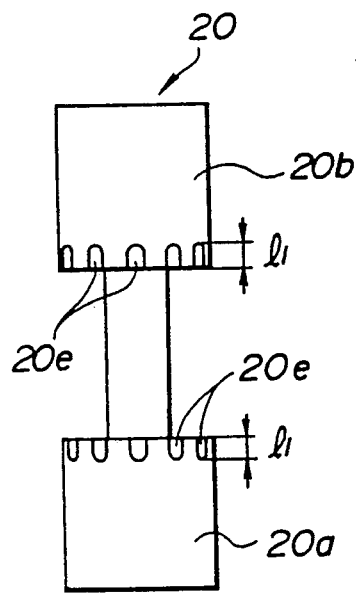
FIG. 3 is a chart showing variation of a control pressure to be supplied to a working chamber of an active cylinder in a suspension system in relation to a control current supplied to an actuator of the pressure control valve unit of the preferred embodiment of FIG. 2.

As seen from FIGS. 2 and 3, a plurality of axially extending notches 20e are formed on the axial edges of the inlet side and drain side lands 20a and 20b. The notches 20e are provided an axial length $l_1$. The axial length $l_1$ of the notches 20e is set in combination with a stroke margin $l_2$ of the main spool valve 20 at the neutral position so that the total axial length $(l_1 + l_2)$ is shorter than the axial stroke L of the main valve spool 20.

Since the operation of the pressure control valves is essentially the same as that of the aforementioned prior applications, publications and patents, the disclosures of which have been incorporated by reference, it may not be necessary to discuss the operations in great detail and a brief discussion of the operations with disclosure of the action of the major components should be sufficient for facilitating full understanding of the invention.

Figure 4:
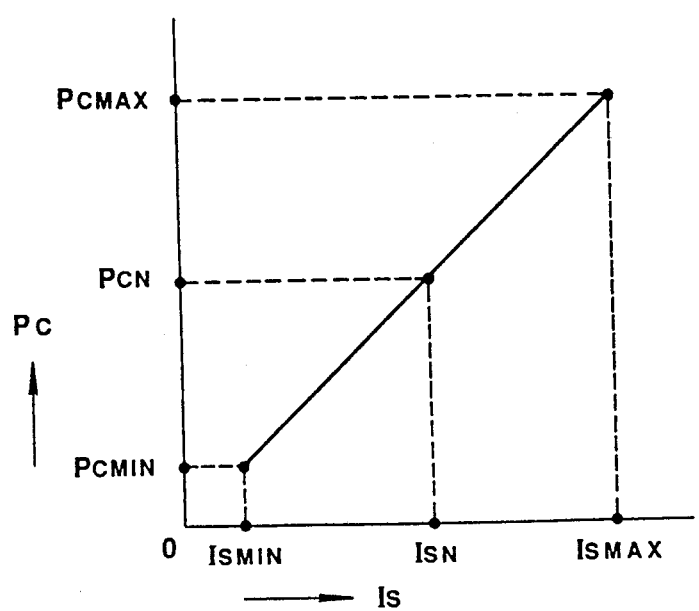
FIG. 4 is a chart showing that the magnitude of electric current in the suspension control signal "Is" is variable between a predetermined minimum level and a predetermined level and a predetermined maximum level.

Upon the setting to ON of a main power switch, i.e. an ignition switch, the suspension control system 9 becomes active to start attitude change suppressive suspension control. At the same time, a fluid pump in the fluid pressure source unit 4 is started to be driven by an automotive internal combustion engine for supplying line pressure through the supply line S. As long as vehicular attitude change is not caused, the control unit 12 feeds the suspension control signal commanding the neutral position of the main valve spool 20. As seen from FIG. 4, the magnitude of electric current in the suspension control signal Is is variable between a predetermined minimum level $Is_{MIN}$ corresponding to a minimum fluid pressure $pc_{MIN}$ in the working chamber and a predetermined maximum level $Is_{MAX}$ corresponding to a maximum pressure level $Pc_{MAX}$ in the working chamber across a level $Is_N$ where the neutral pressure in the working chamber L is established. The electric current level $Is_N$ will be hereafter referred to as a "neutral level".

As long as vehicular attitude change is not caused, the suspension control signal level is maintained at the neutral level $Is_N$ for maintaining the pressure in the working chamber L of the active cylinder 7 at the neutral level $Pc_N$. At this position, substantially high frequency and small magnitude vibration input through the road wheel is absorbed by the pressure accumulator 14 as cooperated with the orifice 13. On the other hand, when the vibratory energy is large enough to induce pressure variation from the neutral pressure $Pc_N$ in the working chamber, the pressure control valve unit 6 becomes active for absorbing the pressure variation and whereby maintains the pressure in the working chamber at the neutral pressure. When the vibratory energy is exerted in a direction so as to cause piston bounding stroke, the pressure in the working chamber L is decreased according to the expansion of the volume of the working chamber. As a result, the pressure in the control chamber 22b as communicated with the working chamber L through the control line C is decreased. According to this, the pressure in the feedback chamber 20j communicated with the feedback path 20d is decreased to destroy the force balance. By this, the main valve spool 20 is shifted for establishing fluid communication with the control chamber 22b and the inlet chamber 21e via the notches 20e formed on the inlet side land 20a to introduce the line pressure into the working chamber. On the other hand, when vibratory energy causes rebounding motion of the piston with compression of the working chamber L, the increased pressure is introduced into the feedback chamber 20j. As a result, the main valve spool 20 is shifted to establish fluid communication between the control chamber 22b and the drain chamber 23e via the notching 20e on the drain side land 20b for draining the increased fluid pressure in the working chamber. Therefore, in response to either bounding or rebounding strokes of the piston, the fluid pressure in the working chamber is adjusted to the neutral pressure. With this operation, vibratory energy causing piston bounding and rebounding strokes can be successfully absorbed.

On the other hand, when vehicular pitching motion, rolling motion or so forth is detected by the sensors including the longitudinal acceleration sensor 11 and/or the lateral acceleration sensor 10, the control unit 12 becomes active to feed suspension control signals to respective proportioning solenoids 6B. The proportioning solenoid 6B is thus energized to cause shifting of the poppet valve toward or away from the valve seat member 17b for varying flow restriction magnitude at the fluid path 17a. According to the flow restriction magnitude, the magnitude of fluid pressure in the pilot chamber PR is varied for causing variation of the force balance and thus causes shifting of the main valve spool 20 from the neutral position. Typically, the suspension control signals are derived so that vehicular attitude change can be suppressed. Namely, when nose diving due to deceleration of the vehicle is detected, the fluid pressure in the working chambers of the front suspension systems is increased and fluid pressure in the working chambers of the rear suspension systems is decreased. On the other hand, when winding up or squatting of the vehicle is detected, the fluid pressure in the working chambers of the front suspension systems is decreased and that in the rear suspension systems is increased. Similarly, when vehicular rolling is detected, the fluid pressure in the suspension systems at the lowered side of the vehicle is increased and that at the lifted side is decreased.

As will be appreciated, in the normal stroke range of the main valve spool 20, fluid communication between the control chamber 22b and the inlet chamber 21e and between the control chamber and the drain chamber 23e is established via the notches 20e on the inlet side and drain side lands 20a and 20b.

Practical active suspension control as performed by the control system has been disclosed and discussed in various co-pending applications, prior publications and prior patents listed hereinbefore.

Figure 5A:
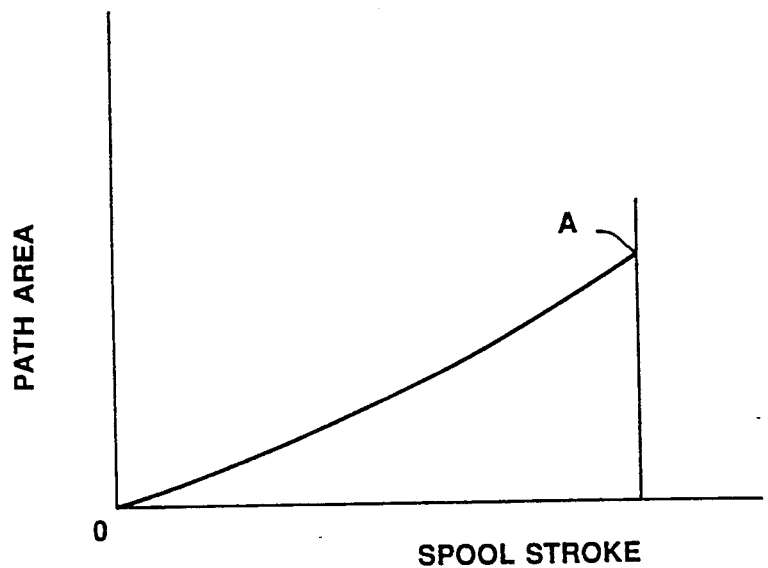
FIGS. 5(A) and 5(B) are charts respectively showing variation of the fluid flow path opening area in the pressure control valve unit according to variations in the stroke of a valve spool of the pressure control valve unit of FIG. 2.
Figure 5B:
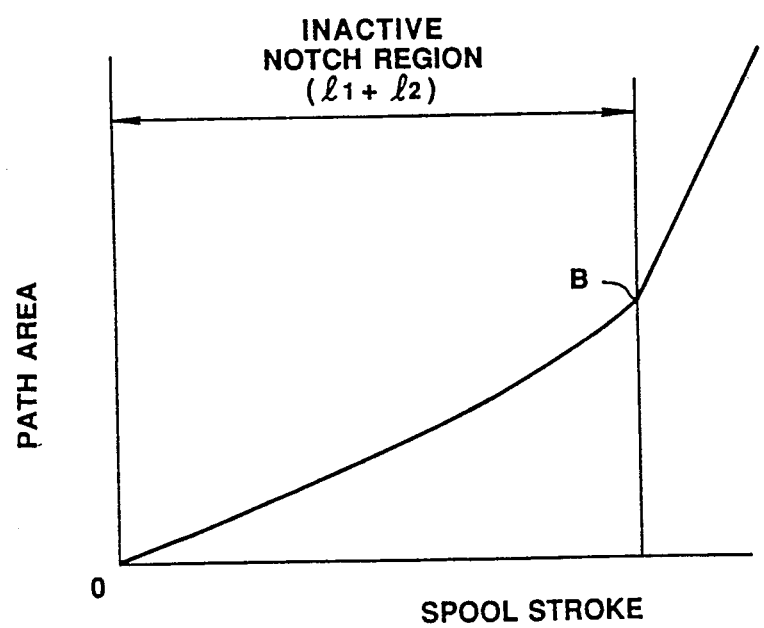

In the shown embodiment of the active suspension system, when the vehicle passes over a substantial magnitude undulation, projection, groove, hole or so forth, on the road, a substantial magnitude of piston stroke is caused. At this time, due to a relatively high speed piston stroke, relatively large magnitude and high speed pressure variation in the working chamber L is caused. According to substantial variation of the fluid pressure in the working chamber, the pressure in the feedback chamber 20j is varied substantially to cause the main valve spool 20 to reach its full stroke L. As set forth, since the axial length $l_1$ of the notches 20e and the stroke margin $l_2$ are set so that the combined length $(l_1+l_2)$ becomes shorter than the stroke L of the main valve spool 20 at full stroke, the fluid path area for fluid commnucation between the control chamber 22b and the inlet chamber 21e and between the control chamber and the drain chamber 23e comes to be increased at greater rate than that in the stroke range smaller than the combined length $(l_1+l_2)$ Variation of the fluid flow path opening area in the shown embodiment of the active suspension system according to the present invention is illustrated in FIG. 5(b). This is compared with the fluid flow path opening area variation in conventional active suspension systems as illustrated in FIG. 5(a). As seen in FIG. 5(a), the flow path area is increased in an approximately linear fashion toward the maximum area, establishing a good balance of vibration absorbing performance and avoidance of extraordinarily high or low fluid pressures in the working chamber is substantially difficult. In contast to this, according to the present invention, since the normally used fluid flow path area is provided by the notches and avoidance of extraordinarily high or low pressures is achieved by the increased fluid flow path area provided by the main valve spool stroke over the notched region (shown in FIG. 5(b)), establishing a good balance in vibration absorbing performance and avoidance of excessive pressure variation becomes easier.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principles of the invention. Therefore, the invention should be understood to include all possible embodiments and modifications to the shown embodiments which can be embodied without departing from the principles of the invention as set out in the appended claims.

What is claimed is:

1. A pressure control valve, for adjusting pressure in a working chamber of a fluid pressure operated unit by introducing and draining working fluid into and from the working chamber, comprising:

a first chamber connected to said working chamber for fluid communication therebetween via a first line;

a second chamber connected to a fluid pressure source via a second line for introducing line pressure from said fluid pressure source into said working chamber;

a third chamber connected to said fluid pressure source via a third line for draining pressurized fluid to said fluid pressure source from said working chamber;

a valve member for selectively establishing and blocking fluid communication between said first and second chambers and said first and third chambers, the valve member being movable in a first range between a first position for establishing fluid communication between said first and second chambers through a first predetermined path opening area and a second position for establishing fluid communication between said first and third chambers through a second predetermined path opening area, and a third position, intermediate said first and second positions, where fluid communication between said first and second chambers and said first and third chambers are both blocked; and means, responsive to a fluid pressure in said working chamber greater than a predetermined pressure, for permitting movement of said valve member within a second range greater than the first range the second range including a fourth position in which fluid communication between said first and second chambers is established through a third path opening area greater than said second path opening area, and a fifth position, in which fluid communication between said first and third chambers is established through a fourth path opening area greater than said second path opening area.

2. A pressure control valve unit as set forth in claim 1, wherein said valve member is designed for varying the rate of increase of fluid path opening area so that the increase rate in a region from said first position to said fourth position is greater than that from said third position to said first position.

3. A pressure control valve unit as set forth in claim 2, wherein said valve member is designed for varying the rate of increase of said fluid path opening area so that the increase rate in a region from said second position to said fifth position is greater than that from said third position to said second position.

4. A pressure control valve unit as set forth in claim 3, wherein said fourth and fifth positions of said valve member are set at the stroke ends of said valve member.

5. A pressure control valve unit as set forth in claim 3, wherein said valve member is formed with at least one notch axially extending for a predetermined length for defining an overlap range for said first chamber in a range between said first position and said second position and between said first position and said third position of said valve member so that a limited flow rate of fluid communication between said first and second chambers and said between first and third chambers is established via said notch within said first range of movement of said valve member.

6. A pressure control valve unit as set forth in claim 5, wherein said valve member establishes direct fluid communication between said first and second chambers during movement from said first position to said fourth position, the overlap magnitude of said first and second chambers being increased according to movement of said valve member toward said fourth position, said valve member also establishing direct fluid communication between said first and third chambers during movement from said second position to said fifth position, the overlap magnitude of said first and third chambers being increased according to movement of said valve member toward said fifth position.

7. A pressure control valve unit as set forth in claim 1, wherein said valve member is designed for varying rate of increase of said fluid path opening area so that the increase in a region from said second position to said fifth position is greater than that from said third position to said second position.

8. A pressure control valve unit as set forth in claim 1, which further comprises an electrically operable actuator associated with said valve member for causing movement of said valve member within said first range at a controlled magnitude for selectively establishing fluid communication between said first and second chambers and said first and third chambers with a limited fluid path opening area varying in a range between zero and a predetermined maximum to said first path opening area and between zero and a predetermined maximum to said second path opening area.

9. A pressure control valve for adjusting a pressure in a working chamber of a hydraulic damper in an active suspension system of an automotive vehicle, by introducing and draining working fluid into and from the working chamber, comprising:
 a first chamber connected to said working chamber for fluid communication therebetween via a first line;
 a second chamber connected to a fluid pressure source via a second line for introducing line pressure from said fluid pressure source into said working chamber;
 a third chamber connected to a fluid pressure source via a third line for draining pressurized fluid to said fluid pressure source from said working chamber;
 a valve member for selectively establishing and blocking fluid communication between said first and second chambers and said first and third chambers, said valve member being movable in a first range between a first position for establishing fluid communication with said first and second chambers and a second position for establishing fluid communication with said first and third chambers, through a first predetermined path opening area, and across a third position where fluid communication of said first and second chambers and said first and third chambers are both blocked; and
 means, responsive to a fluid pressure in said working chamber greater than a predetermined pressure, for permitting movement of said valve member within a second range greater than said first range between a fourth position and a fifth position at which fluid communication between said first and second chambers and between said first and third chambers is established through a predetermined second path opening area greater than said first path opening area.

10. A pressure control valve unit as set forth in claim 9, wherein said valve member is designed for varying the rate of increase of fluid path area so that the rate of increase of said fluid path area in a region between said first position and said fourth position and between said second position to said fifth position is greater than that from said third position to one of said first and second positions.

11. A pressure control valve unit as set forth in claim 10, wherein said fourth and fifth positions of said valve member are set at stroke ends of said valve member.

12. A pressure control valve unit as set forth in claim 11, which further comprises an electrically operable actuator associated with said valve member for causing movement of said valve member within said first range at a controlled magnitude for selectively establishing fluid communication between said first and second chambers and said first and third chambers with a limited fluid path opening area varying in a range between zero and a predetermined maximum to said first path opening area and between zero and a predetermined maximum to said second second path opening area.

13. A pressure control valve unit as set forth in claim 12, wherein said valve member is formed with at least one notch axially extending for a predetermined length for defining a overlap range for said first chamber in a range between said first position and said third position and between said second position and said third position of said valve member so that a limited flow rate of fluid communication between said first and second chambers and said between first and third chambers is established via said notch within said first range of movement of said valve member.

14. A pressure control valve unit as set forth in claim 13, wherein said valve member establishes direct fluid communication between said first and second chambers during movement from said first position to said fourth position, the overlap magnitude of said first and second chambers increased according to movement to said valve member toward said fourth position, and establishes direct fluid communication between said first and third chambers during movement from said second position to said fifth position, the overlap magnitude of said first and third chambers being increased according to movement of said valve member toward said fifth position.

15. An active suspension system for an automotive vehicle, comprising:
 a suspension mechanism including a hydraulic cylinder disposed between a vehicular body and a suspension member rotatably supporting a road wheel, said hydraulic cylinder defining a working chamber therein, which working chamber is of a volume variable according to a piston stroke induced by relative movement between said vehicular body and said suspension member;
 a fluid source for feeding pressurized working fluid;
 a pressure control valve disposed in a hydraulic circuit connecting said fluid source and said working chamber for adjusting fluid pressure in said working chamber by controlling the introduction and draining of working fluid into and from said working chamber, said pressure control valve comprising
 a first chamber connected to said working chamber for fluid communication therebetween via a first line,
 a second chamber connected to a fluid pressure source via a second line for introducing line pressure from said fluid pressure into said working chamber,
 a third chamber connected to a fluid pressure source via a third line for draining fluid to said fluid pressure source from said working chamber,
 a valve member for selectively establishing and blocking fluid communication between said first and second chambers and said first and third chambers, said valve member being movable in a first range between a first position for establishing fluid communication between said first and second chambers through a first predetermined path opening area and a second area and a second position establishing a fluid communication between said first and third chambers through a second predetermined path opening area and across a third position where fluid communication between said first and second chambers and said first and third chambers are both blocked, and means, responsive to a fluid pressure in said working chamber greater than a predetermined pressure, for permitting movement of said valve member in a second range greater that said first range, between a fourth position in which fluid communication is established between said first and second chambers through a third path opening area greater than said first path opening area and a fifth position in which fluid communication is established between said first and third chambers through a fourth path opening area greater than said second path opening area.

16. An active suspension system as set forth in claim 15, wherein said valve member is designed for varying the rate of increase of said fluid path area so that the rate of increase of said fluid path area in a region between said first position to said fourth position is greater than that from said third position to said first position.

17. An active suspension system as set forth in claim 16, wherein said valve member is designed for varying rate of increase of said fluid path area so that the rate of increase of said fluid path area in a region between said second position to said fifth position is greater than that from said third position to said second position.

18. An active suspension system as set forth in claim 17, wherein said fourth and fifth positions of said valve member are set at stroke ends of said valve member.

19. An active suspension system as set forth in claim 17, wherein said valve member is formed with at least one notch axially extending for a predetermined length for defining a overlap range for said first chamber in a range between said first position and said second position and between said first position and said third position of said valve member so that a limited flow rate of fluid communication between said first and second chambers and said between first and third chambers is established via said notch within said first range of movement of said valve member.

20. An active suspension system as set forth in claim 19, wherein said valve member establishes direct fluid communication between said first and second chambers during movement from said first position to said fourth position, the overlap magnitude of said first and second chambers being increased according to movement of said valve member toward said fourth position, and establishes direct fluid communication between said first and third chambers during movement from said second position to said fifth position, the overlap magnitude of said first and third chambers being increased according to movement of said valve member toward said fifth position.

21. An active suspension system as set forth in claim 15, wherein said valve member is designed for varying the rate of increase of said fluid path area so that the rate of increase of said fluid path area in a region between said second position to said fifth position is greater than that from said third position to said second position.

22. An active suspension system as set forth in claim 15, which further comprises an electrically operable actuator associated with said valve member for causing movement of said valve member within said first range at a controlled magnitude for selectively establishing fluid communication between said first and second chambers and said first and third chambers with a limited fluid path area varying in a range between zero and a predetermined maximum to said first path area and between zero and a predetermined maximum to said second second path area.

* * * * *